US011652545B2

(12) United States Patent
Bownass et al.

(10) Patent No.: US 11,652,545 B2
(45) Date of Patent: May 16, 2023

(54) AVOIDING FIBER DAMAGE ON NON-SUPERVISORY OPTICAL FIBER LINKS

(71) Applicant: Ciena Corporation, Hanover, MD (US)

(72) Inventors: David C. Bownass, Ottawa (CA); Choudhury A. Al Sayeed, Stittsville (CA); Jean-Yves Levesque, Gatineau (CA); Bing Liu, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/102,493

(22) Filed: Nov. 24, 2020

(65) Prior Publication Data

US 2022/0166500 A1 May 26, 2022

(51) Int. Cl.
*H04B 10/079* (2013.01)
*H04B 10/073* (2013.01)
*H04B 10/032* (2013.01)

(52) U.S. Cl.
CPC ....... *H04B 10/0731* (2013.01); *H04B 10/032* (2013.01); *H04B 10/0795* (2013.01); *H04B 10/0797* (2013.01); *H04B 10/07955* (2013.01)

(58) Field of Classification Search
None
See application file for complete search history.

(56) References Cited

U.S. PATENT DOCUMENTS

| | | | | |
|---|---|---|---|---|
| 5,428,471 A * | 6/1995 | McDermott | ........... | H04B 10/03 370/216 |
| 6,317,255 B1 * | 11/2001 | Fatehi | ........... | H04B 10/071 359/341.44 |
| 6,359,708 B1 * | 3/2002 | Goel | ........... | H04B 10/564 398/178 |
| 6,404,948 B2 | 6/2002 | Alexander et al. | | |
| 6,483,616 B1 * | 11/2002 | Maddocks | ........... | H04B 10/0771 398/1 |
| 6,547,453 B1 * | 4/2003 | Stummer | ........... | H04B 10/071 385/24 |
| 6,583,899 B1 * | 6/2003 | Casanova | ........... | H04B 10/077 398/173 |
| 6,795,607 B1 | 9/2004 | Archambault et al. | | |
| 6,807,001 B1 * | 10/2004 | Ranka | ........... | H01S 3/1312 359/334 |

(Continued)

*Primary Examiner* — Li Liu
(74) *Attorney, Agent, or Firm* — Baratta Law PLLC; Lawrence A. Baratta, Jr.

(57) ABSTRACT

Systems and methods for avoiding fiber damage of an optical fiber link are provided. A method, according to one implementation, includes monitoring optical signals transmitted along an optical fiber link from an output port of a first card to an input port of a second card. In response to detecting a fiber disconnection state when an amplifier of the first card is operating in a normal condition, the amplifier of the first card enters a forced Automatic Power Reduction (APR) condition. In addition to potentially reducing the risk of eye damage from laser light emitted from the optical fiber link, the forced APR condition is configured to allow for an uninterrupted debugging procedure. Also, the method includes returning the amplifier of the first card from the forced APR condition back to the normal operating condition after receiving an indication that the fiber disconnection state has cleared.

15 Claims, 6 Drawing Sheets

(56) References Cited

U.S. PATENT DOCUMENTS

| | | | |
|---|---|---|---|
| 7,773,884 B2* | 8/2010 | Ghera | H04B 10/07955 398/92 |
| 7,809,272 B2 | 10/2010 | Zhong et al. | |
| 8,364,036 B2 | 1/2013 | Boertjes et al. | |
| 8,457,497 B2 | 6/2013 | Zhong et al. | |
| 8,509,621 B2 | 8/2013 | Boertjes et al. | |
| 8,625,994 B2 | 1/2014 | Archambault et al. | |
| 8,774,632 B2 | 7/2014 | Archambault | |
| 9,060,215 B2 | 6/2015 | Miedema | |
| 9,385,805 B2* | 7/2016 | Schimpe | H04B 10/0791 |
| 9,583,911 B2* | 2/2017 | Uehara | H01S 3/1306 |
| 9,680,569 B2 | 6/2017 | Archambault et al. | |
| 9,793,986 B2 | 10/2017 | Archambault et al. | |
| 9,806,803 B2 | 10/2017 | Bownass et al. | |
| 9,882,634 B1 | 1/2018 | Al Sayeed et al. | |
| 9,973,295 B2 | 5/2018 | Al Sayeed et al. | |
| 10,063,313 B1* | 8/2018 | Al Sayeed | H04J 14/029 |
| 10,237,011 B2 | 3/2019 | Al Sayeed et al. | |
| 10,277,352 B2 | 4/2019 | Chedore et al. | |
| 10,439,709 B1 | 10/2019 | Al Sayeed | |
| 10,536,235 B2 | 1/2020 | Al Sayeed et al. | |
| 10,541,748 B1 | 1/2020 | Chedore | |
| 10,630,417 B1 | 4/2020 | Chedore et al. | |
| 10,680,737 B1 | 6/2020 | Al Sayeed et al. | |
| 10,680,739 B2 | 6/2020 | Swinkels et al. | |
| 10,735,837 B1 | 8/2020 | Al Sayeed et al. | |
| 10,992,374 B1* | 4/2021 | Miedema | H04B 10/0775 |
| 2001/0050806 A1* | 12/2001 | Sasaki | H04B 10/291 359/341.43 |
| 2002/0024690 A1* | 2/2002 | Iwaki | H04J 14/0221 398/13 |
| 2003/0194233 A1* | 10/2003 | Casanova | H04B 10/07955 398/2 |
| 2004/0047628 A1* | 3/2004 | Passier | H04J 14/0221 398/15 |
| 2004/0120643 A1* | 6/2004 | Viswanathan | G02B 6/02114 385/37 |
| 2004/0179845 A1* | 9/2004 | Yamashita | H04J 14/0241 398/83 |
| 2004/0208519 A1* | 10/2004 | Feldman | H04B 10/0771 398/30 |
| 2005/0200944 A1* | 9/2005 | Kobayashi | H04B 10/071 359/333 |
| 2007/0177254 A1* | 8/2007 | Ghera | H04B 10/2931 359/334 |
| 2008/0075459 A1* | 3/2008 | Wang | H04B 10/0771 398/32 |
| 2008/0175587 A1* | 7/2008 | Jensen | H04L 1/22 398/2 |
| 2008/0232797 A1* | 9/2008 | Muzicant | H04B 10/03 398/30 |
| 2008/0240713 A1* | 10/2008 | Lu | H04B 10/03 398/17 |
| 2009/0154941 A1 | 6/2009 | Mateosky et al. | |
| 2009/0207482 A1* | 8/2009 | Izumi | H04B 10/2916 359/334 |
| 2009/0324214 A1* | 12/2009 | Li | H04B 10/03 398/1 |
| 2011/0008051 A1* | 1/2011 | Miyaji | H04B 10/0771 398/79 |
| 2011/0211829 A1* | 9/2011 | Schimpe | H04B 10/0791 398/33 |
| 2011/0220776 A1* | 9/2011 | Abedin | G01M 11/3145 250/205 |
| 2012/0224848 A1* | 9/2012 | Yano | H04B 10/0793 398/20 |
| 2013/0322875 A1* | 12/2013 | Iijima | H04B 10/0775 398/37 |
| 2014/0022626 A1* | 1/2014 | Eliyahu | H01S 3/30 359/334 |
| 2014/0055777 A1* | 2/2014 | Archambault | G01M 11/3145 356/73.1 |
| 2014/0072306 A1* | 3/2014 | Sridhar | H04J 14/0275 398/79 |
| 2014/0104679 A1* | 4/2014 | Bao | H01S 3/302 359/334 |
| 2014/0328583 A1* | 11/2014 | Al Sayeed | H04J 14/0202 398/7 |
| 2014/0348501 A1* | 11/2014 | Bao | H04B 10/0797 398/29 |
| 2018/0248617 A1* | 8/2018 | Al Sayeed | H04J 3/14 |
| 2019/0097719 A1 | 3/2019 | Chedore et al. | |
| 2019/0101447 A1 | 4/2019 | Pei et al. | |
| 2019/0238251 A1 | 8/2019 | Chedore et al. | |
| 2019/0253139 A1* | 8/2019 | Satou | H04J 14/02 |
| 2019/0356407 A1* | 11/2019 | Al Sayeed | H04J 14/021 |
| 2020/0007262 A1 | 1/2020 | Chedore et al. | |
| 2020/0228197 A1 | 7/2020 | Bhatnagar et al. | |

* cited by examiner

AVOIDING FIBER DAMAGE ON NON-SUPERVISORY OPTICAL FIBER LINKS

TECHNICAL FIELD

The present disclosure generally relates to optical networking systems and methods. More particularly, the present disclosure relates to avoiding damage to optical fibers when one end of an optical fiber link is disconnected and being cleaned.

BACKGROUND

Generally, eye safety is a legitimate concern in the field of optical communication systems. Since the emission of laser light used for communicating optical signals can cause eye damage, care must be taken to ensure that people operating and maintaining fiber optic cables do not accidentally expose their eyes to this potentially harmful light. There are numerous systems that are known for ensuring laser eye safety, particularly when a "live" optical fiber link is disconnected on just one end. When one end of the fiber is disconnected, an Optical Line Fail (OLF) can be detected to confirm that disconnection has taken place. This condition can be confirmed by detecting Loss of Frame (LOF), Loss of Signal (LOS), or Loss of Modulation (LOM) on supervisory communication channels running over the fiber link. In such case, amplifiers on both ends of a fiber link may be shut down to ensure line safety. In the absence of supervisory communication over a fiber link, laser eye safety can also be ensured by locally detecting either a high optical back-reflection (which represents an open connector), or in some cases, by locally detecting LOS on the reverse incoming port (e.g., for Multi-fiber Push-On (MPO) cables where transmit and receive fibers are in the same cable).

However, these steps for practicing laser eye safety do not guarantee that the optical fibers, particularly the fiber tips, will not be damaged when the cable is disconnected, such as during maintenance (e.g., for fiber cleaning, debugging, etc.), especially in the absence of any supervisory communication over the fiber link. For example, the process of cleaning fiber tips has been known to cause accidental damage to the fiber tips, particularly when an optical fiber is heavily loaded with multiple channels in the spectrum. Presently, in systems where Amplified Spontaneous Emission (ASE) is used to fill unused channels in the spectrum with ASE-based channel holders, the light intensity will remain high, representing a fully-filled channel loading condition. With such high light intensity, not only is there a danger with respect to eye safety, but also the damage to fiber tips during cleaning can be exacerbated. This becomes a problem for network operations, especially during the cleaning of intra-node fibers following an optical amplifier, where there is no supervisory traffic to monitor the fiber break.

To avoid fiber damage, conventional systems normally highlight explicit procedures to administratively shut down the upstream amplifier before disconnecting a live fiber. In order to avoid potential fiber damage, conventional systems suggest that handlers (e.g., network operators, maintenance people, or others) follow explicit procedures while disconnecting and reconnecting such live fibers. For example, the explicit instructional procedures may include: 1) Putting the upstream amplifier administratively out of service or in a forced shut-off state before disconnecting the fibers, 2) Once the cleaning and potential scoping (e.g., with external digital imaging) is complete, reconnecting the fibers, 3) Then putting the upstream amplifier administratively back in-service to re-evaluation Optical Return Loss (ORL) and back-reflection conditions, and 4) If the fiber patch is not cleaned or the high loss issue or back-reflection issue is not resolved, then the above procedures will need to be repeated. However, these instructions and warnings are often ignored.

Also, the above procedures of the conventional systems are considered cumbersome and can add significant overhead with respect to maintenance operations since the operator or maintenance person may have to clean multiple patch panels. Another shortcoming is that, for each cycle, the above safety procedures may need to be repeated if there are issues while the fiber is disconnected. Therefore, there is a need in the field of optical communication system to provide systems and techniques for disconnecting fiber optic cables (e.g., during maintenance, cleaning, or debugging) in a manner that follows practical eye safety protocols while also simplifying the maintenance procedures to reduce overhead and overcome the shortcomings mentioned above.

BRIEF SUMMARY

According to one implementation of the present disclosure, a system includes a processing device and a memory device configured to store a computer program having instructions. When executed, the instructions cause the processing device to monitor optical signals transmitted along an optical fiber link from an output port of a first card (of an optical communication system) to an input port of a second card (of the optical communication system). In response to detecting a fiber disconnection state when an amplifier of the first card is in a normal operating condition, the instructions further enable the processing device to cause the amplifier of the first card to enter a forced Automatic Power Reduction (APR) condition, wherein the forced APR condition is configured to allow for an uninterrupted debugging procedure. The instructions further cause the processing device to return the amplifier of the first card from the forced APR condition back to the normal operating condition after receiving an indication that the fiber disconnection state has cleared.

According to another implementation of the present disclosure, a non-transitory computer-readable medium may be configured to store computer logic having instructions that, when executed, cause one or more processing devices to monitor optical signals transmitted along an optical fiber link from an output port of a first card (of an optical communication system) to an input port of a second card (of the optical communication system). In response to detecting a fiber disconnection state when an amplifier of the first card is in a normal operating condition, the instructions further cause the one or more processing devices to cause the amplifier of the first card to enter a forced Automatic Power Reduction (APR) condition. The forced APR condition is configured to allow for an uninterrupted debugging procedure. The instructions also cause the one or more processing devices to return the amplifier of the first card from the forced APR condition back to the normal operating condition after receiving an indication that the fiber disconnection state has cleared.

According to yet another implementation of the present disclosure, a method includes a step monitoring optical signals transmitted along an optical fiber link from an output port of a first card to an input port of a second card. In response to detecting a fiber disconnection state when an amplifier of the first card is in a normal operating condition, the method includes the step of causing the amplifier of the first card to enter a forced Automatic Power Reduction (APR) condition, wherein, in addition to potentially reducing the risk of eye damage from laser light emitted from the optical fiber link, the forced APR condition is configured to allow for an uninterrupted debugging procedure. The method also includes the step of returning the amplifier of the first card from the forced APR condition back to the normal operating condition after receiving an indication that the fiber disconnection state has cleared.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
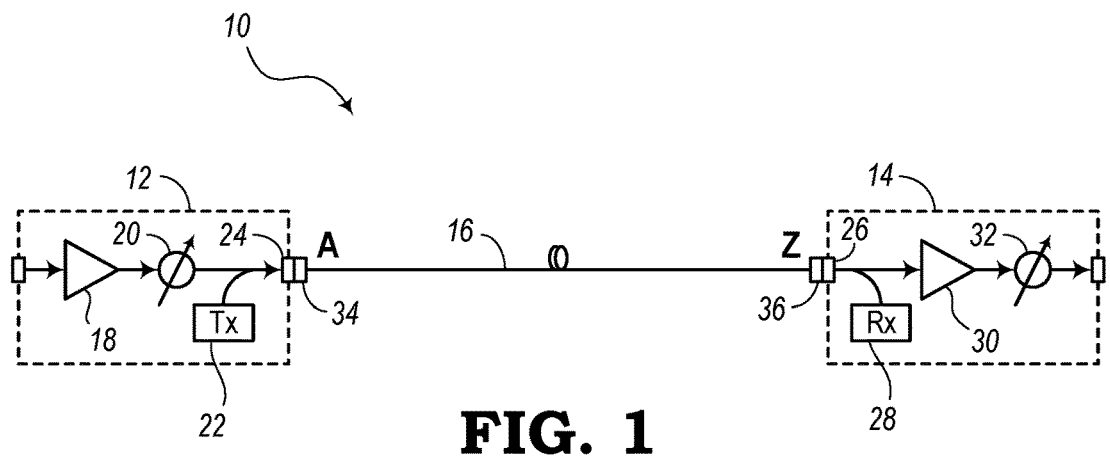
FIG. 1 is a schematic diagram illustrating a portion of an optical communication system having supervisory communication between neighboring nodes, according to various embodiments.

The present disclosure relates to systems and methods for avoiding fiber damage while doing cleaning and maintenance of a live optical fiber. The optical fiber being "live" indicates that the fiber link is still attached at one end and carries light loaded with traffic channels and/or Amplified Spontaneous Emission (ASE)-based channel holders. It may be noted that cleaning of intra-node fiber links may typically be required for debugging low Optical Return Loss (ORL) issues, generated from high back-reflection at the connectors of the fiber optic cables. To debug such issues, the fiber usually must be lit from the connected end to show improvement of reflection conditions on the opposite end, in order to avoid future non-linear issues, such as Multi-Path Interference (MPI). In terms of field operations, the back and forth administrative procedure (i.e., shutting down the upstream amplifier and turning it back on again after reconnecting), during the cleaning process, can be cumbersome and disruptive for typical operations flow.

Techniques are disclosed herein for overcoming the issues with the conventional back and forth procedures. For example, the systems and methods of the present disclosure are configured to consider the outgoing node-level fiber link knowledge between two different cards or endpoints, instead of just focusing on a single port ORL or Loss of Signal (LOS) condition. The embodiments of the present disclosure are configured to detect a fiber link break (or disconnect) condition by confirming valid "power level" at the output ("from") port of a fiber link and "loss" (e.g., LOS) at the input ("to") port of a fiber link. In response to such detection of output power level and/or input loss, the systems described herein are configured to enforce an Automatic Power Reduction (APR) on the "from" port. This "forced APR" condition is not released until the fiber break condition is cleared. At the forced APR state, the upstream amplifier is kept alive with an output power level that is reduced below a fiber-damage threshold (e.g., <50 mW).

Known systems in the field are focused primarily on laser safety only and are based on local port reflection or loss on supervisory communications. However, the embodiments of the present disclosure improve upon the conventional systems by not only promoting eye safety, but also by providing techniques that are configured to reduce damage to the fiber tips of fibers during a cleaning process. The systems and methods of the present disclosure can be distinguished from the conventional systems by considering the outgoing node-level fiber link knowledge, instead of just focusing on a single port ORL or LOS condition. Furthermore, the present disclosure is also advantageous over prior systems by keeping the power level below a fiber-damage threshold level that allows valid ORL detection and valid confirmation of link break clearance, while at the same time continuing to reduce the risk of eye damage. Thus, the systems and methods herein may utilize the knowledge and coordination between power levels reported in two different cards of a node in an optical communication system. This allows the embodiments to be configured to reduce fiber damage (on top of reducing laser eye damage) along with keeping at least an upstream amplifier alive (at a reduced level) for uninterrupted debugging processes.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a diagram showing an embodiment of a portion of an optical communication system 10 having supervisory communication between a first node 12 and a second node 14, which may be considered to be operationally adjacent or neighboring nodes. This figure shows an example of laser safety for reducing the risk of eye damage in the optical communication system 10. In this embodiment, laser safety is enabled when an optical fiber link 16 (e.g., fiber link, fiber span, optical cable, fiber optical cable, etc.) is configured to allow supervisory communication between the nodes 12, 14. In this embodiment, the first node 12 includes an amplifier 18, a Variable Optical Attenuator (VOA) 20, a supervisory transmitter 22, and a port connector 24. Similarly, the second node 14 includes a port connector 26, supervisory receiver 28, an amplifier 30, and a VOA 32. The optical fiber link 16 includes a first connector 34 configured for connection with the port connector 24 of the first node 12 and a second connector 36 configured for connection with the port connector 26 of the second node 14.

It should be noted that the embodiment of FIG. 1, along with other embodiments described throughout the present disclosure, that although the propagation of signals may be shown in only one direction (e.g., left to right on the page) in many instances, the optical fiber link (e.g., optical fiber link 16) may be configured to allow communication bi-directionally. However, for the purposes of illustration, signal transmission is shown as originating at the node (or card) where the optical fiber link 16 remains connected. For example, the left end of the optical fiber link 16 (e.g., at point "A") remains connected via connector 34 and port connector 24, while the right end of the optical fiber link 16 (e.g., at point "Z") may be either connected to, disconnected from, or reconnected to the second node 14 via connector 36 and port connector 26 shown on the right side of the page. In FIG. 1, for example, the optical fiber link 16 is shown in a connected state between points A and Z.

Since the optical fiber link 16 in this embodiment is configured as a "supervisory" optical fiber link, the supervisory transmitter 22 of the first node 12 is configured to propagate supervisory control signals to the optical fiber link 16 at point Z and the supervisory receiver 28 of the second node 14 is configured to receive the supervisory control signals. In this way, the optical fiber link 16 itself can be used to communicate supervisory signals or control signals to enabling the nodes 12, 14 to operate in a coordinated fashion. Supervisory optical fiber links may be defined as the links that have some level of supervisory communications carried along the link between the end points of that link. Typically, these supervisory optical fiber links are node to node (or inter-nodal) optical fiber links or fiber spans. In this example of FIG. 1, the optical fiber link 16 between points A and Z is configured with an Optical Supervisory Channel (OSC) to communicate supervisory signals, and hence the optical fiber link 16 may be considered as a supervisory optical fiber link.

Figure 2:
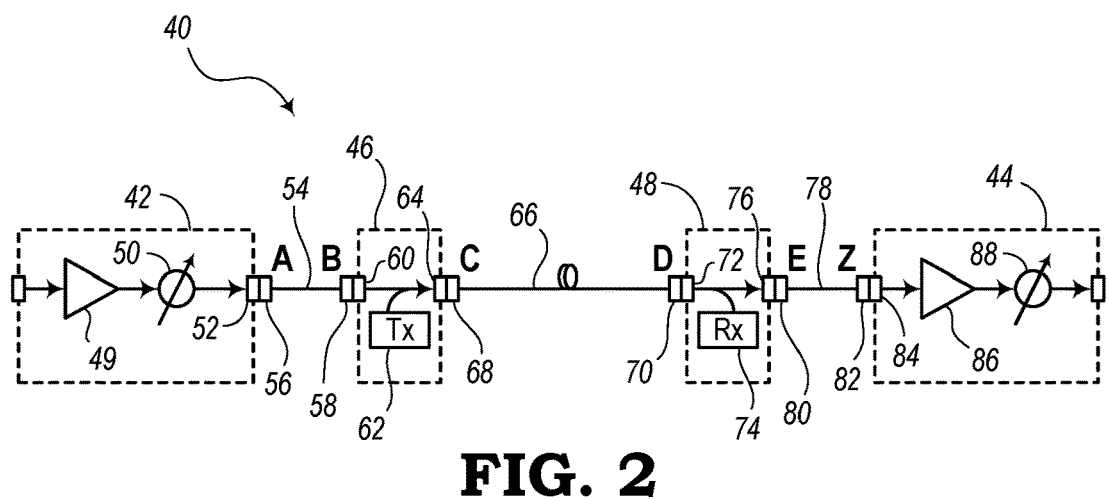
FIG. 2 is a schematic diagram illustrating another portion of an optical communication system having supervisory communication, according to various embodiments.

FIG. 2 shows another embodiment of a portion of an optical communication system 40 having supervisory communication. In this embodiment, a first node 42 is configured to communication with a second node 44, whereby first and second intermediate amplifiers 46, 48 are arranged operationally between the first and second nodes 42, 44. The intermediate amplifiers 46, 48 may each include a Raman amplifier or other suitable amplifier device. The first node 42 includes an amplifier 49, a VOA 50, and a port connector 52. A first optical fiber link 54 includes a first connector 56 configured for connection with the port connector 52 of the first node 42 and a second connector 58 configured for connection with a connector 60 of the first intermediate amplifier 46. The first intermediate amplifier 46 further includes a supervisory transmitter 62 and another connector 64.

In this embodiment, another optical fiber link 66 (e.g., a supervisory optical fiber link) includes a first connector 68 configured for connection with the connector 64 of the first intermediate amplifier 46 and a second connector 70 configured for connection with a connector 72 of the second intermediate amplifier 48. The second intermediate amplifier 48 includes a supervisory receiver 74 configured to receive supervisory control signals from the supervisory transmitter 62 of the first intermediate amplifier 46 via the supervisory optical fiber link 66. The second intermediate amplifier 48 further includes another connector 76.

Another optical fiber link 78 includes a first connector 80 configured for connection with the connector 76 of the second intermediate amplifier 48 and a second connector 82 configured for connection with a port connector 84 of the second node 44. The second node 44 further includes an amplifier 86 and a VOA 88.

The optical fiber link 54 (e.g., linking points A and B) is configured to enable communication between the first node 42 and the first intermediate amplifier 46 when the first connector 56 is connected to the port connector 52 of the first node 42 and the second connector 58 is connected to the connector 60 of the first intermediate amplifier 46. The optical fiber link 66 (e.g., linking points C and D) is configured to enable communication between the first intermediate amplifier 46 and the second intermediate amplifier 48 when the first connector 68 is connected to the connector 64 of the first intermediate amplifier 46 and the second connector 70 is connected to the connector 72 of the second intermediate amplifier 48. The optical fiber link 78 (e.g., linking points E and Z) is configured to enable communication between the second intermediate amplifier 48 and the second node 44 when the first connector 80 is connected to the connector 76 of the second intermediate amplifier 48 and the second connector 82 is connected to the port connector 84 of the second node 44.

The optical fiber link 66 linking points C and D may be a Raman amplified link and may enable supervisory communication, e.g., over telemetry signaling. Similarly, optical fiber links 54, 66, 78 linking points A and Z may enable additional supervisory communication over OSC if the distance between points A and Z remain within the OSC reach, considering the additional gain from Raman pumps of the intermediate amplifiers 46, 48. However, the extra OSC reach may not be guaranteed and hence may not be used for laser safety.

The advantage of supervisory optical fiber links (e.g., the optical fiber link 16 shown in FIG. 1 and the optical fiber link 66 shown in FIG. 2) is that they can be used for laser safety procedures to protect the eyes of technicians maintaining the fiber spans. For these supervisory links, when the supervisory communication is lost, an Optical Line Fail (OLF) condition is detected in a downstream amplifier and will put the downstream amplifier in a shut-off state. The amplifiers on both ends of the link experiencing the OLF condition, including the Raman pumps, are forced to shut off for laser safety. When the link is reconnected and the supervisory communication is restored, the downstream amplifier comes out of the shut-off state and the link is considered to be fixed.

Figure 3:
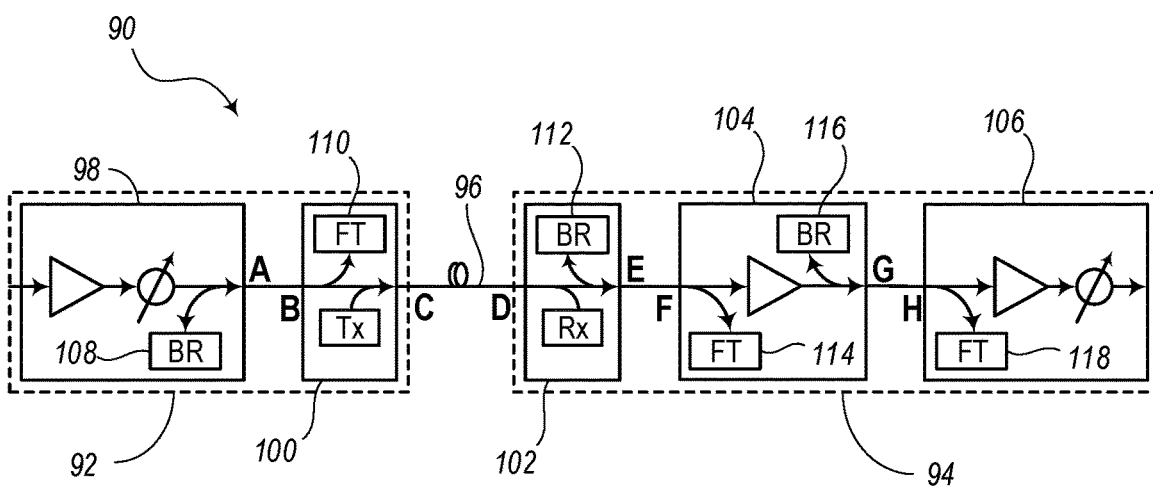
FIG. 3 is a schematic diagram illustrating yet another portion of an optical communication system including some links which have no supervisory communication, according to various embodiments.

FIG. 3 is a diagram showing an embodiment of yet another portion of an optical communication system 90. In this embodiment, a first node 92 is connected to a second node 94 via a supervisory optical fiber link 96 (e.g., connected at points C and D). The connections of the optical communication system 90 include intra-nodal links. However, the intra-nodal links do not include supervisory communication as described with respect to the inter-nodal links shown in FIGS. 1 and 2. Even without supervisory communication within a node (i.e., intra-node supervisory links), the optical communication system 90 can still bring about laser safety without traditional supervisory communication.

In the example of FIG. 3, three intra-nodal links are shown between points A-B, E-F, and G-H. These links may be optical fiber links or fiber patches connecting line or terminal equipment, but may not have any supervisory communication signaling between the end points. In this example, the optical fiber link A-B is connected between an amplifier card 98 (e.g., an Erbium-Doped Fiber Amplifier (EDFA)) and a supervisory card (e.g., part of a Raman circuit pack) 100 of the first node 92, the optical fiber link E-F is connected between a supervisory card (e.g., Raman) 102 and a first amplifier card 104 (e.g., EDFA) of the second node 94, and the optical fiber link G-H is connected between two cascaded amplifiers (i.e., the first amplifier card 104 and a second amplifier card 106, such as an EDFA). Although the supervisory cards 100, 102 may be used for inter-nodal supervisory communication, there is not supervisory communication within each node 92, 94 itself.

For such intra-nodal optical fiber links, each line-facing port is equipped with back-reflection power monitors. For example, with respect to the optical fiber link A-B, a Back-Reflection (BR) monitor 108 of the amplifier card 98 is configured for monitoring the power reflected back to the A port and a Forward Tap (FT) 110 of the supervisory card 100 is configured for monitoring the input power received at the B port. Similarly, a BR monitor 112 of the supervisory card 102 is configured for monitoring the power reflected back to the E port and a FT 114 of the amplifier card 104 is configured for monitoring the input power received at the F port. Also, a BR monitor 116 of the first amplifier card 102 is configured for monitoring the power reflected back to the G port and an FT 118 of the second amplifier card 106 is configured for monitoring the input power received at the H port.

When one of the intra-node links (or fiber patches) is disconnected, the respective BR (at the port where the disconnection is made) is able to detect an increased power and a reduced Optical Return Loss (ORL), that may, in turn, force an Automatic Power Reduction (APR) on the upstream amplifier card (e.g., an EDFA). Due to loss of light, any downstream amplifier unit goes into a shut-off state. The amount of power reduction in an upstream amplifier unit is configured to be lower than a laser 1M safety limit (i.e., <21.3 dBm @ 1550 nm) to ensure eye safety.

Figure 4:
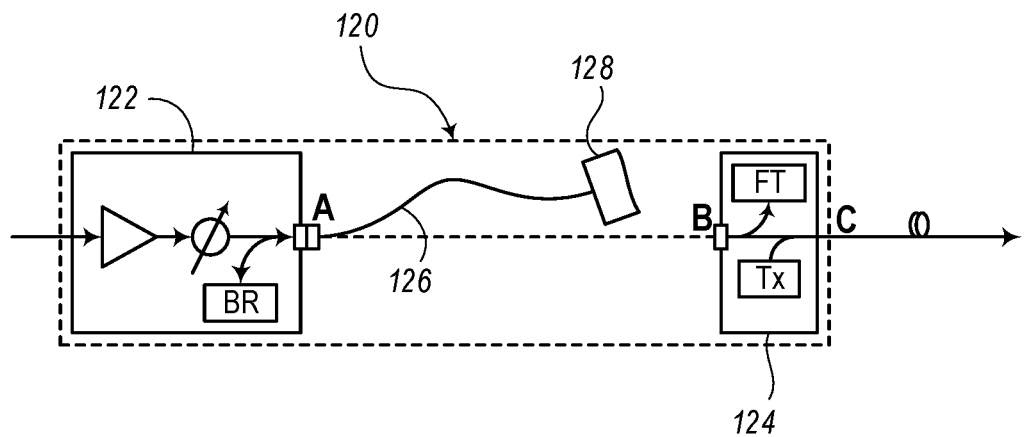
FIG. 4 is a schematic diagram illustrating a fiber disconnect condition between two intra-nodal cards of a node in an optical communication system, according to various embodiments.

FIG. 4 shows a node 120 of an optical communication system in which there is a fiber disconnect condition between two intra-nodal cards 122, 124. An optical fiber link 126 is configured for connection between ports A and B. However, as shown, one end of the optical fiber link 126 (at the B port) is disconnected from the second card 124 while the first end of the optical fiber link 126 remains connected to the first card 122 at port A. The B-port end of the optical fiber link 126 may be disconnected intentionally for cleaning, debugging, etc. For example, an operator or technician may disconnect the one end to clean the tips of the fibers using any suitable cleaning elements, solutions, devices, etc.

With regular APR techniques, a problem may start when any of the intra-node fibers are disconnected for cleaning or for debugging any back-reflection or high-loss issues. When the fiber is disconnected, to maintain laser safety, an upstream amplifier of the card 122 is forced to go into the APR state to reduce the power coming out of the free end of the fiber. However, as soon as the free end of the fiber is terminated in a fiber-cleaner device for wiping and for cleaning up the fiber-tip, a BR monitor of the card 122 may detect low back-reflection (or high ORL) and the upstream amplifier of the card 122 is forced out of the APR condition and returns to normal power.

If the line-system is heavily loaded with spectrum with many channels and/or is fully-filled (or mostly filled) with ASE (e.g., as in an ASE-loaded line system), then the upstream amplifier of the card 122 can generate high optical power (e.g., about 22-23 dBm or higher) that can easily damage the fiber tip during the cleaning process. In this case, reducing the total power at fiber input during the APR state to much lower than the laser 1M limit has no impact, since when the fiber is terminated at the cleaner, it will come out of the APR state at full operational power level regardless of the power level set at the APR condition.

There are two cards 122, 124 in the node 120. The first card 122 may include an EDFA amplifier and the downstream card 124 may include a Raman Amplifier (RA), although it is not necessarily arranged with a Raman amplifier in that given direction, but may be a Raman card where a filter may be. The second card 124 may include a noise filter, telemetry filter, etc., or could simply just be a Raman card or even a card without a Raman amplifier. Thus, there may be two back-to-back cards 122, 124 present in a fiber plant.

When the intra-node optical fiber link 126 is disconnected at one end, changes can be detected at both ports (e.g., port A at the output of the card 122 and port B at the input of the card 124). When an external or inter-node (node-to-node) optical fiber link is disconnected, there may usually be a supervisory communication over the fibers of the optical fiber link. Based on the supervisory communication generating RTI signals, actions can be taken on both ends of that link. However, in this case of an intra-nodal link, there will normally be no supervisory communication or any control in this respect. If an optical fiber link is disconnected, there will normally be no communication between cards 122, 124 or along the optical fiber link between port A and port B. On port A of the first card 122, there is a Back-Reflection (BR) monitor for monitoring any back reflections of signals transmitted from port A along the optical fiber link 126. When there is a disconnected fiber, the back reflection sensed by the BR monitor goes very high, which means that an optical re-channel loss (or ORL) becomes very low, because the reflection is very high and the channel loss is very low. In this case, the node 120 may be configured to automatically dial down the power, which is referred to as Automatic Power Reduction (APR).

This technique may be used for some cards that are known. There are normally no problems with this APR technique. However, problems may arise when a user (e.g., operator, technician, etc.) takes the end of the loose disconnected fiber and starts cleaning the surfaces of the fiber tips. From the point of view of the first card 122, when the fiber tips are covered, the reflections may be gone, which may give the impression that the internal loss may be good as well. If it looks like the loose end has been reconnected, the first card 122 may decide to go back to normal operation, such as the power provided before the fiber disconnection state was detected. When it returns to that high power, the APR state will not be used at that point since it appears that the link 126 has been returned to normal.

When a user goes in to start cleaning up the fibers, the APR may be automatically cleared, cleaning may be finished, and gain is turned up. This may still be fine with respect to eye safety procedures, but the problem may occur where the amplifier may be heavily loaded with ASE channel holders to fill in extra unused spectrum and the spectrum is at or near a fully filled condition. When the user disconnects the link to start cleaning the fiber tips when the power is at or near full capacity, the power may cause the fiber tips to burn during the cleaning process, depending on the cleaning techniques, solutions used for cleaning, the end surfaces of the fibers, the fiber connectors, etc. It may be possible that the high power can damage the fibers because it may be above a fiber damage threshold. Therefore, according to some embodiments of the present disclosure, the power may be maintained below this fiber damage threshold to reduce the risk of the fibers being damaged or burned. This damage can also be caused in some situations even when the ASE does not fully fill the spectrum.

Figure 5:
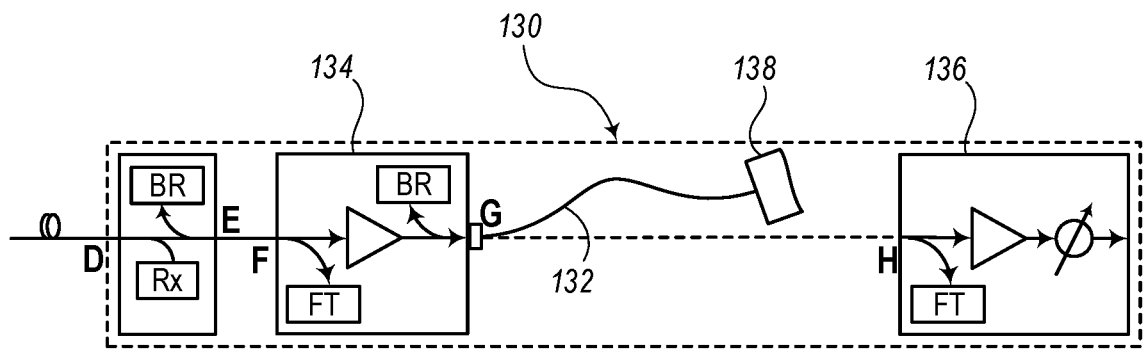
FIG. 5 is a schematic diagram illustrating a fiber disconnect condition between operationally adjacent cards in a node in an optical communication system, according to various embodiments.

FIG. 5 shows another node 130 of an optical communication system where there is a fiber disconnect condition between operationally adjacent cards in the node 130. In this example, the link between ports E and F remains connected, while an optical fiber link 132 initially connected between a G port of a first amplifier card 134 and an H port of a second amplifier card 136 is disconnected. Particularly, one end of the optical fiber link 132 is freed from the H port to allow the fiber tips of the optical fiber link 132 to be cleaned and/or debugged. As shown, the free end may be connected to and/or cleaned by a fiber cleaning device 138.

Again, the intra-nodal link does not include supervisory communication. The problem remains valid for the process of disconnecting and cleaning any "live" intra-node fibers that are carrying traffic channels and/or channelized ASE holder channels. No supervisory communication is directly detected when there is a fiber break (or disconnection). For a low channel fill situation or non-ASE loaded systems, where the operational power of the amplifier is low, the chances for fiber damage is also low. However, the problem may be likely to occur in an ASE-loaded system or in a system with high channel count condition.

Figure 6:
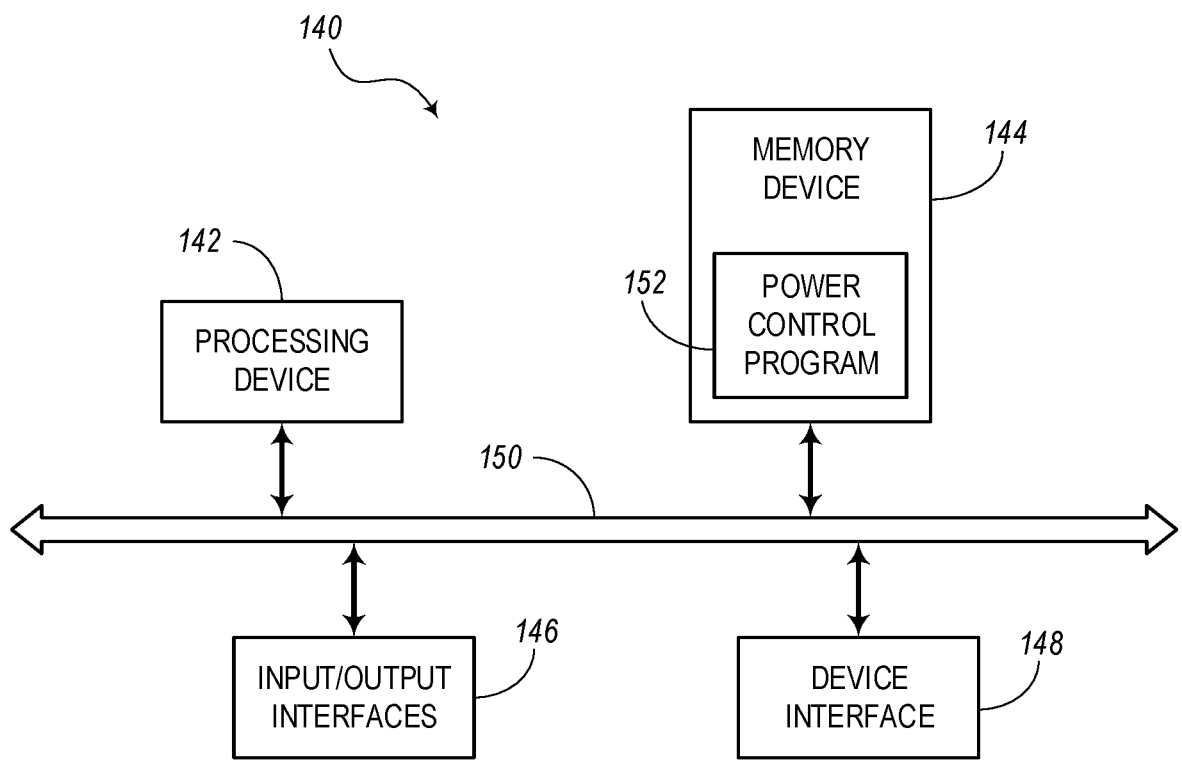
FIG. 6 is a block diagram illustrating a controller for providing supervisory control over a node of an optical communication system during a fiber disconnect condition, according to various embodiments.

FIG. 6 is a block diagram illustrating an embodiment of a controller 140 for providing supervisory control over a node of an optical communication system during a fiber disconnect condition, according to various embodiments. In the illustrated embodiment, the controller 140 may be a digital computer that, in terms of hardware architecture, generally includes a processing device 142, a memory device 144, Input/Output (I/O) interfaces 146, and a device interface 148. The memory device 144 may include a data store, database, or the like. It should be appreciated by those of ordinary skill in the art that FIG. 6 depicts the controller 140 in a simplified manner, where practical embodiments may include additional components and suitably configured processing logic to support known or conventional operating features that are not described in detail herein. The components (i.e., 142, 144, 146, 148) are communicatively coupled via a local interface 150. The local interface 150 may be, for example, but not limited to, one or more buses or other wired or wireless connections. The local interface 150 may have additional elements, which are omitted for simplicity, such as controllers, buffers, caches, drivers, repeaters, receivers, among other elements, to enable communications. Further, the local interface 150 may include address, control, and/or data connections to enable appropriate communications among the components 142, 144, 146, 148.

The processing device 142 is a hardware device adapted for at least executing software instructions. The processing device 142 may be any custom made or commercially available processor, a Central Processing Unit (CPU), an auxiliary processor among several processors associated with the controller 140, a semiconductor-based microprocessor (in the form of a microchip or chip set), or generally any device for executing software instructions. When the controller 140 is in operation, the processing device 142 may be configured to execute software stored within the memory device 144, to communicate data to and from the memory device 144, and to generally control operations of the controller 140 pursuant to the software instructions.

It will be appreciated that some embodiments of the processing device 142 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 142 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 146 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 146 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra- Red (IR) interface, a Radio Frequency (RF) interface, and a Universal Serial Bus (USB) interface.

The device interface 148 may be used to enable the controller 140 to communicate over a network, the Internet, a Wide Area Network (WAN), a Local Area Network (LAN), and the like, such as for controlling a card or a node in an optical communication system. The device interface 148 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The device interface 148 may include address, control, and/or data connections to enable appropriate communications on the controlled device.

The memory device 144 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 144 may incorporate electronic, magnetic, optical, and/or other types of storage media. The memory device 144 may have a distributed architecture, where various components are situated remotely from one another, but can be accessed by the processing device 142. The software in memory device 144 may include one or more software programs, each of which may include an ordered listing of executable instructions for implementing logical functions. The software in the memory device 144 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 144 may include a data store used to store data. In one example, the data store may be located internal to the controller 140 and may include, for example, an internal hard drive connected to the local interface 150 in the controller 140. Additionally, in another embodiment, the data store may be located external to the controller 140 and may include, for example, an external hard drive connected to the Input/Output (I/O) interfaces 146 (e.g., SCSI or USB connection). In a further embodiment, the data store may be connected to the controller 140 through a network and may include, for example, a network attached file server.

Moreover, some embodiments may include a non-transitory computer-readable storage medium having computer readable code stored in the memory device 144 for programming the controller 140 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 142 that, in response to such execution, cause the processing device 142 to perform a set of operations, steps, methods, processes, algorithms, functions, techniques, etc. as described herein for the various embodiments.

The memory device 144 may store a power control program 152 configured to enable the controller 140 to control a node in an optical communication system or to control one or more cards within the node. The power control program 152 may enable the processing device 142 to control the power of amplifier cards when a fiber disconnection is detected. This allows the power to be reduced to a safe level for reducing the risk of eye damage from lasers and for reducing the chance that the fiber tips of the free end of the disconnected optical fiber link can get burned by high power laser light in combination with the cleaning process.

The controller 140 may be configured to detect a fiber link break condition by confirming valid power level at the "from" port of a fiber link and a Loss of Signal (LOS) condition at the "to" port of a fiber link. The controller 140 may enforce an Automatic Power Reduction (APR) on the "from" port. The APR condition may be ensured either by forcing the amplifier to reduce its output power level and/or by increasing the VOA attenuation to reduce the power at the "from" port.

Figure 7:
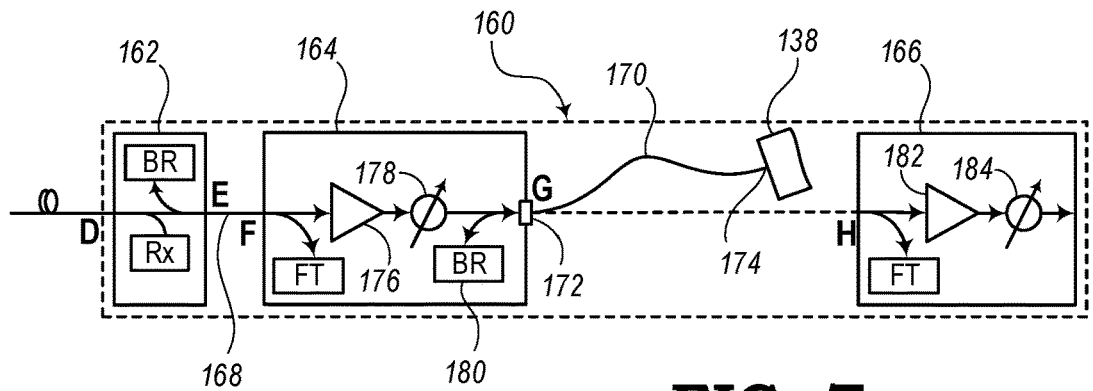
FIG. 7 is a schematic diagram illustrating a fiber disconnect condition between two operationally adjacent cards in a node of an optical communication system, according to various preferred embodiments.

FIG. 7 is a diagram of a node 160 of an optical communication system and shows a fiber disconnect condition between two operationally adjacent cards in the node 160. In some respect, the embodiment of FIG. 7 may be considered to be a preferred embodiment for avoiding fiber damage during an optical fiber link disconnection. As shown in this example, the node 160 includes a supervisory card 162, a first amplifier card 164, and a second amplifier card 166.

An intra-nodal optical fiber link 168 is connected at one end to a port E of the supervisory card 162 and connected at the other end to a port F of the first amplifier card 164. Another intra-nodal optical fiber link 170 is initially connected at a first end 172 to a port G of the first amplifier card 164 and connected at a second end 174 to a port H of the second amplifier card 166. However, a fiber disconnection occurs at port H when the second end 174 of the intra-nodal optical fiber link 170 is removed from the connector at port H.

The first amplifier card 164 includes an amplifier 176, a Variable Optical Attenuator (VOA) 178, and a Back-Reflection (BR) monitor 180. The second amplifier card 166 includes an amplifier 182, a VOA 184, a Forward Tap (FT), and a supervisory receiver (not shown). The supervisory receiver may be configured to receive supervisory control signals from a supervisory transmitter of a downstream card.

The system detects a fiber link break (or disconnection) condition by confirming valid power level at the "from" port (e.g., port G) of the intra-nodal optical fiber link 170 and LOS at the "to" port (e.g., port H) of the intra-nodal optical fiber link 170. The system also enforces an APR state on the "from" port. The APR condition is maintained by forcing the amplifier 176 of the first amplifier card 164 to reduce its output power level and/or by forcing the VOA 178 of the first amplifier card 164 to increase its attenuation. These actions may be performed to reduce the power at the "from" port (e.g., port G) of the first amplifier card 164.

The forced APR condition is released only when the link break condition is cleared, such as when both ends of the optical fiber link 170 have valid power level. For example, valid power at the G port may include a power level greater than LOS+hysteresis. At the forced APR state, the total power at the "from" port G is reduced below a fiber damage threshold level (e.g., less than about 50 mW), and well above a valid power level threshold. This allows a user to clean the fiber-tips safely and plug it back in to the "to" port H or in to a Fiber Management System (FMS). The node 160 may re-evaluate back-reflections at the back-reflection monitor 180 without going through the back and forth administrative process of shutting down amplifiers.

Although the embodiments are described for intra-node (i.e., within node 160), it is possible to extend the logic for inter-node fiber links as well, where the controller resides on the upstream node and gets notifications from a downstream node for port LOS condition, such as via a network connection or some other means of non-supervisory communication. The method may work unidirectionally for a given fiber link.

Instead of just detecting an issue (e.g., fiber break, optical fiber link disconnection, etc.) from the point of view on a single card, the embodiments described herein are configured to correlate knowledge of the optical fiber link with the downstream card, fault point. Instead of merely detecting back-reflection on the output port G, the systems described herein are configured to look at the break (or disconnection) from both ends of where the optical fiber link 170 would normally be connected (i.e., at output port G and input port H). The fiber disconnection state is correlated at both ends to detect when a proper reconnection is made. If there is power at port A but no power at port B, it can be determined that there is a broken fiber or a disconnection. If a fiber broken condition is detected, the node 160 may be configured to perform an improved version of the APR technique. However, instead of simply reducing power as is done in conventional systems, the embodiments of the present disclosure are configured to reduce power to a certain level to reduce the risk of eye injury while also reducing the risk of damaging or burning the fiber tips (if a cleaning process is going on). This reduced power level may be reduced enough to avoid these risks, but also may be high enough to enable any debugging processes that a user may perform.

The forced APR in the present disclosure reduces or forces the system to a reduced power state, until confirmation is received back that the downstream card (e.g., card 166) is good. For example, this could be implemented in at least a couple ways. One embodiment may include the configuration shown in FIG. 7 and another embodiment may include the configuration described below with respect to FIG. 10. In FIG. 7, the system is configured to look for good power at power A or low power at B and consider whether there is a fiber break condition. Until the fiber break condition clears, the APR state is not released.

Figure 8:
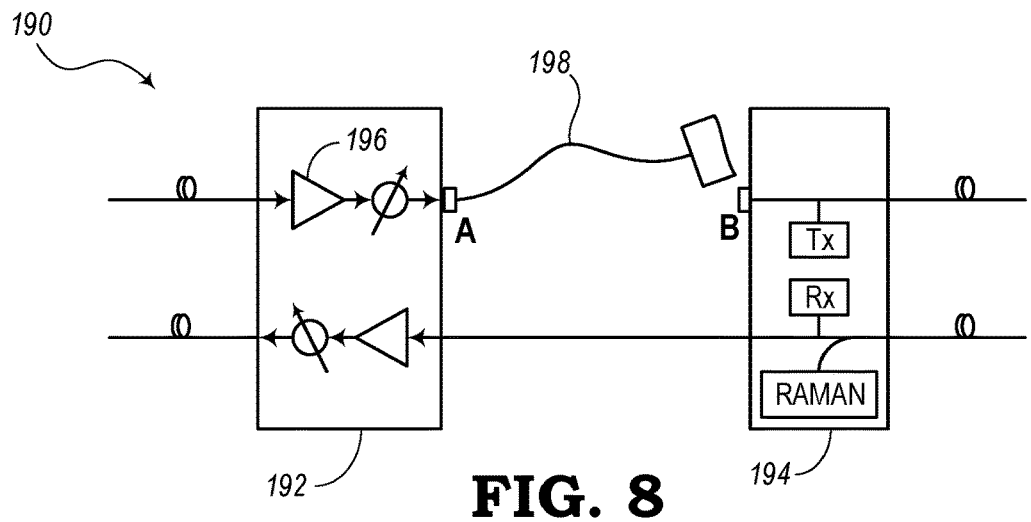
FIG. 8 is a schematic diagram illustrating a fiber disconnect condition in a node of an optical communication system showing bi-directional communication, according to various embodiments.

FIG. 8 is a diagram illustrating an embodiment of a node 190 of an optical communication system where a fiber disconnect condition is present between a first card 192 and a second card 194. In this example, the node 190 is shown with bi-directional communication. When the fiber disconnect condition is detected, an amplifier 196 upstream from a fiber link 198 is configured to remain in a forced APR state until the fiber disconnect condition (or link break condition) clears.

A method may be implemented with the arrangement of the node 190 to ensure a forced APR condition by considering a low ORL on the upstream and local APR detection on the upstream amplifier 196 (at port A) and considering LOS on the downstream port (i.e., port B). The method may effectively ensure good valid power at the upstream card 192 (since an amp APR will not be raised without good power) and LOS on downstream card 194.

Advantages of the systems and methods of the present disclosure may include the result where fiber cleaning for high reflection may happen at initial node installation, where traditionally a link may remain dark. Alternatively, this may happen in a maintenance window where most of the layer 0 channels are diverted away on traditional non-ASE loaded links. Typically, operators are not trained to put the amplifiers into administrative outage before cleaning the fibers. However, with ASE-loading on fiber links, this will likely not be the case. In such configurations, fiber links can carry 250 mW worth of power even on non-Raman amplified links, irrespective of any channel population, which is above any fiber damage threshold (e.g., about 50 mW).

The systems and methods may also allow users to operate an ASE or non-ASE loaded link in the same way for a given maintenance operation, regardless of their channel population, and without going through the hassle of multiple administrative outages. Also, the present embodiments can be implemented using controllers residing on a shelf-processor or controller module, or can be implemented on one of the photonic amplifier cards within the shelf (e.g., thereby bypassing the controller module), where data communication (e.g., collecting power, ORL or LOS information, etc.) between cards can be done over backplane (or control plane) communication.

Reconfigurable Line System (RLS) Automatic Power Reduction (APR)

According to some embodiments, the change in behavior may be monitored in a photonic system, such as an RLS. Again, Automatic Power Reduction (APR) is a mechanism wherein, when the measured Optical Return Loss (ORL) is below a certain threshold, the output power of an amplifier will be reduced in order to avoid damage and ensure a safe level.

In some RLS systems operating in the C-band (i.e., 1530 to 1565 nm), the APR power level may be set to 20.5 dBm when APR is detected. When operating in the C+L-band (i.e., 1530 to 1625 nm), the APR power level may be set to 17.5 dBm. In some cases, it has been detected that high APR power levels may cause damage to connectors. In order to handle this potential issue, the embodiments of the present disclosure may be configured with the specific features as follows. The APR level may be reduced to 10 dBm for each EDFA in the C-band or reduced to 7 dBm for each EDFA in the C+L-band. Recovery of the APR will be dependent on the LOS status of the mate card in hybrid configurations. Some hybrid configurations may include Raman Amplifiers (RAs), Line Amplifiers (LAs), or other types of amplifiers in various combinations, etc. The APR actions may be taken even when the controller module is not present. Because of this request, the work may be performed on the IM.

APR Behavior Change

APR behavior change may be detected. For example, in an EDFA to RA fiber pull (e.g., EDFA card behavior), there may be no change in behavior on detection for APR. The only change may be the APR level, which is set on the controller module that is modified from 20.5 to 10 dBm. In a RA to EDFA fiber pull (e.g., RA card behavior), if the RA is in a low ORL condition and the EDFA has input LOS, then the method may include shutting down the Raman amplifier pumps.

For recovery, if the EDFA in the APR state and the RA express in port in LOS, the method may include not recovering. If the RA is in a recovery mode from a Line Out APR and the EDFA input port is in a LOS condition, the method does not recover. The information about the input LOS of the mate card may be communicated between cards via a bus.

Figure 9:
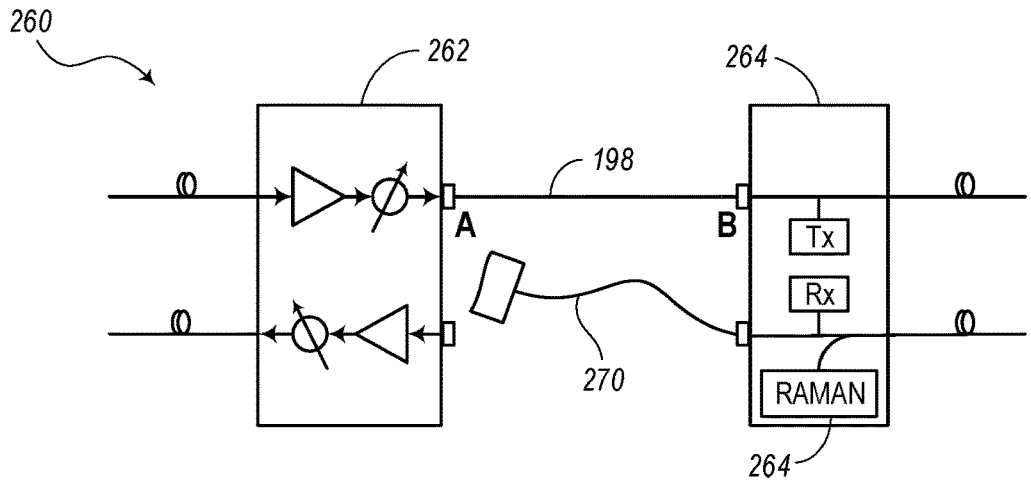
FIG. 9 is a schematic diagram illustrating a fiber disconnect condition in a node of an optical communication system showing bi-directional communication, according to various embodiments.

FIG. 9 shows an embodiment of a node 260 of an optical communication system where a fiber disconnect condition is present between a first card 262 and a second card 264. Again, the node 260 is shown with bi-directional communication. Instead of the fiber disconnect condition being present in the optical fiber link 198 (as shown in FIG. 8), the example of FIG. 9 shows a fiber disconnect condition that is present in an optical fiber link 270 in which optical signals are transmitted from the second card 264 to the first card 262 (in the opposite direction as shown in FIG. 8). When the fiber disconnect condition is detected, a Raman amplifier 266 upstream from the fiber link 270 is configured to remain in a forced APR state until the fiber disconnect condition (or link break condition) clears.

The embodiment of FIG. 9 illustrates a situation where the upstream card (e.g., second card 264) is a Raman card and the downstream card (e.g., first card 262) is an EDFA card. In response to detecting the fiber disconnection state, Raman pumps of the Raman amplifier 266 are shut down to reduce power below a fiber-damage threshold and an eye-damage threshold. In response to receiving an indication that the fiber disconnection state has cleared, the Raman pumps of the Raman amplifier 266 can be turned back up to normal operation. As described below with respect to FIG. 10, the cards 262, 264 may be controlled by first and second controllers, respectively. For example, the first controller may be in communication with the first card and the second controller may be in communication with the second card. The first and second controllers may be configured to detect when the fiber disconnection state occurs and when the fiber disconnection state is cleared.

System Behavior-Fiber Pull

Figure 10:
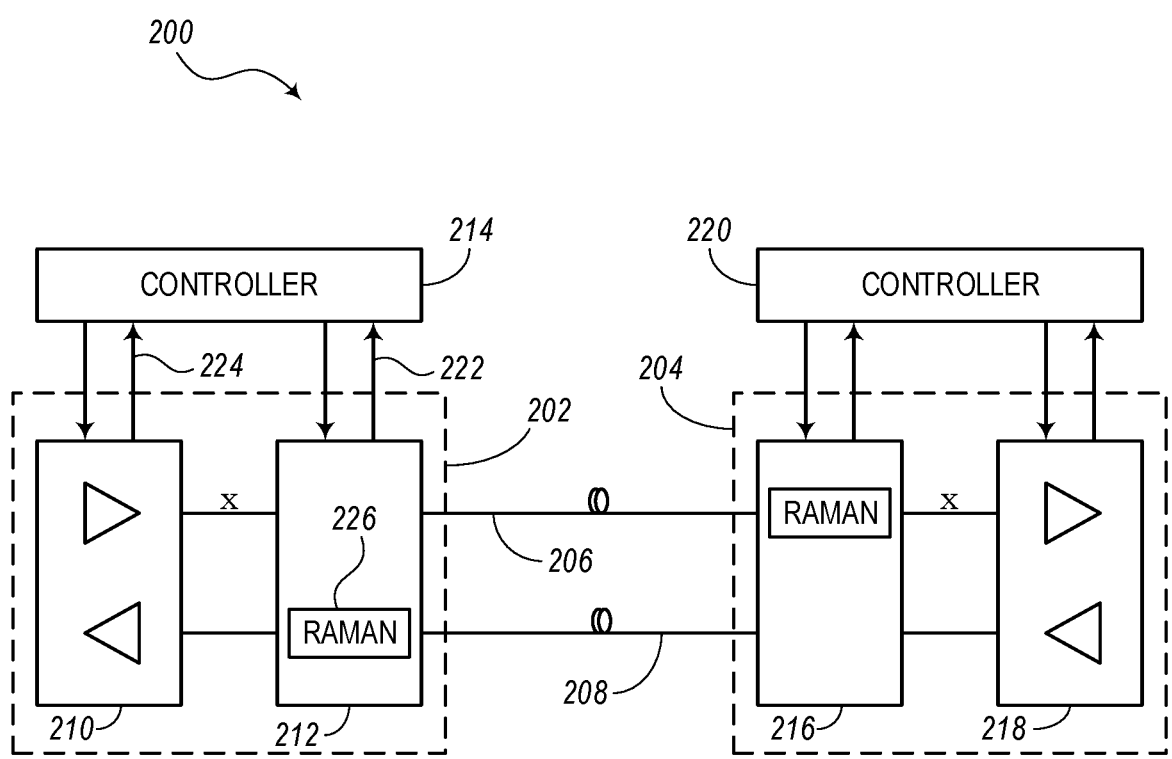
FIG. 10 is a schematic diagram illustrating a portion of an optical communication system having control systems at each node for handling fiber disconnect conditions along a transmitting line, according to various preferred embodiments.

FIG. 10 is a schematic diagram showing an embodiment of a portion of an optical communication system 200 having control systems at each node for handling fiber disconnect conditions along a transmitting line. The portion of the optical communication system 200 includes a first node 202 and a second node 204 configured for bi-directional communication. Optical signals may be communicated from the first node 202 to the second node 204 via a first optical fiber link 206 and optical signals may be communication from the second node 204 to the first node 202 via a second optical fiber link 208. The first node 202 includes an EDFA card 210 and a Raman Amplifier (RA) card 212, each of which may be controlled by a first controller 214. The second node 204 includes an RA card 216 and an EDFA card 218, each of which may be controlled by a second controller 220.

In this embodiment, a power level may be detected that indicates a fiber disconnection state. A local APR condition may be detected first, and that condition is maintained and not released until a downstream LOS is clear. This implementation may be viewed as being different from the embodiment of FIG. 7 but may effectively obtain the same results, such that the outcome will essentially be the same. In this way, it may be possible to ensure or guarantee that when someone is cleaning up the fiber, the downstream LOS is still present. The APR condition will not be released (to return back to normal power) beyond fiber damage thresholds. In this way, the fiber remains safe from a fiber-damaging point of view.

Thus, instead of using only one point (or one port) for determining when to release the APR condition, the embodiments of the present disclosure include the reliance of both ends (i.e., both ports where the link is normally connected during normal operation). FIG. 10 involves implementing a controller module level. In some embodiment this controller can be bypassed such that control can be passed to the card level.

For detection, the RA card 216 may detect LOS at an input (e.g., Express In) on the optical fiber link 206. The RA card 216 may send input LOS via a bus 222 to the controller 214. The EDFA card 210 detects APR on the EDFA and goes into an APR state.

For recovery, the RA card 212 clears the LOS on the bus 222, the EDFA card 210 detects that the APR is clear and that the RA LOS is clear. Then, the EDFA card 210 turns the pumps back to target gain.

According to other implementation of the portion of the optical communication system 200 of FIG. 10, detection may include the RA card 212 detecting a low ORL and Line Out measured power greater than 10 dBm. The EDFA card 210 may detect and send Input LOS via a bus 224 (e.g., EPE bus). The RA card 212 may shuts down the pumps of a Raman amplifier 226. For recovery, a low ORL may clears on the RA card 212. The EDFA card 210 sends a LOS Clear via the bus 224 and the RA card 212 turns the pumps of the Raman amplifier 226 on. In this case, no Optical Time Domain Reflectometry is required.

LOS Detection/Recovery

For detection, the EDFA card 210 may raise the APR (e.g., no change). The RA card 212 may raise a Low ORL and the Raman output power of the RA card 212 may be greater than 10.0 dBm (e.g., change to power level). A low ORL on the Raman output may be triggered at 22 dBm. For recovery, the EDFA card 210 may include an APR clear and the Raman amplifier 226 of the RA card 212 may include an "input LOS clear." The Raman amplifier 226 may include a low ORL clear and the EDFA card 210 may include an "input LOS clear."

In the case of no controller 214 or missing controller module, the node 202 may consider the input LOS point as raised. For missing controller module, the optical communication system 200 may not be recovered until the first controller 214 is reseated. Messaging between cards 210, 212 may require the first controller 214 to be present for recovery.

Timing Requirements

For detection, the APR may be set the same as other systems. The Raman pumps 226 may be shut off. Since this is not related to safety but is done to avoid connector damage on recovery, the timing is not a significant issue. For example, the time target may be about 500 ms. For example, recovery may be done about one second after LOS has cleared.

The time between the disconnection of the fiber and the forcing of the APR condition may depend on whether the controllers 214, 220 are utilized. With the controllers 214, 220 or other control-based approach, this time from disconnect to forced APR may be about two to four seconds. With a "direct communication" approach (e.g., Line Amplifier (LA) card 210 directed in communication with the RA card 212), communication may be made via a backplane whereby the controllers 214, 220 are bypassed. In this case, the time from disconnect to forced APR may be reduced to less than about one second.

On a typical high loss condition (e.g., macro-bending condition, no ORL trigger, etc.), there may be no triggering that would cause the LA to shut down. The LOS threshold on the RA express in port may be=−16 dBm as a default. Typical operating condition for LA booster out may be about 23 dBm for C-band and about 22 dBm for L-band. That means to trigger a link break condition, a pinch of about 40 dBm would be needed. With that pinch level, traffic would certainly be gone and worrying about an APR condition may be a moot point.

According to the implementations herein, link break conditions may be processed, which of course would result in a very high loss that can theoretically put the amplifier in an APR state. Considering the amplifier already in the APR state before implementing the forced APR condition may be considered to be redundant. However, that can be included as a pre-requisite condition before enforcing the ARR condition.

The direct communication has a dependency on a controller switch. With redundant controllers 214, 220 in each LA chassis, if both controllers 214, 220 are physically pulled out, then the recovery mechanism will not work. Otherwise, the controllers 214, 220 may have no impact on recovery.

In the embodiment, where the controllers 214, 220 are utilized (e.g., as implemented for a 2.0.60 patch), an external DCN or communications issue (e.g., inferring "no on-line") does not impact the operation of the controllers 214, 220 since both cards are part of the same chassis. In this case, the EDFA card 210 will remain at a low power state even with ORL clearing, since controllers 214, 220 may still be running and can detect fiber loss/break.

However, if both controllers 214, 220 (e.g., active and backup) are physically pulled out and then the fiber is pulled out, the local EDFA card 210 will go to the APR state, but will come out of APR if fiber is terminated to a cleaner since the controllers 214, 220 do not have a chance to enforce the APR state on the card. If a fiber is pulled out and the controllers 214, 220 are placed out of service, then the forced APR state will be imposed on the EDFA card 210 and will not come out of that state even with ORL clearing. Typically, it is desirable not to disconnect line-fibers "accidentally" without a proper maintenance window, as that is going to bring down all the data traffic.

A fiber cleaning may be needed in a plant when an alarm is raised in the first place, such as an APR alarm or low ORL detected alarm or a high fiber loss alarm. To get those alarms in the first place, the controllers 214, 220 may need to be accessed. The reason for not shutting down the amplifiers and reducing the power while cleaning the fiber is that the ORL condition can remain visible for easier debugging. To retrieve those ORL values, an operator may need to access the controllers 214, 220. One embodiment may include possibility would be physically pulling out both controllers 214, 220 and then allowing a user (e.g., operator, technician, or other person in the lab) to "accidentally" pull the fiber to the Raman amplifier 226 of the RA card 212 to bring down the entire line traffic. However, this possibility would preferably be extremely low.

Figure 11:
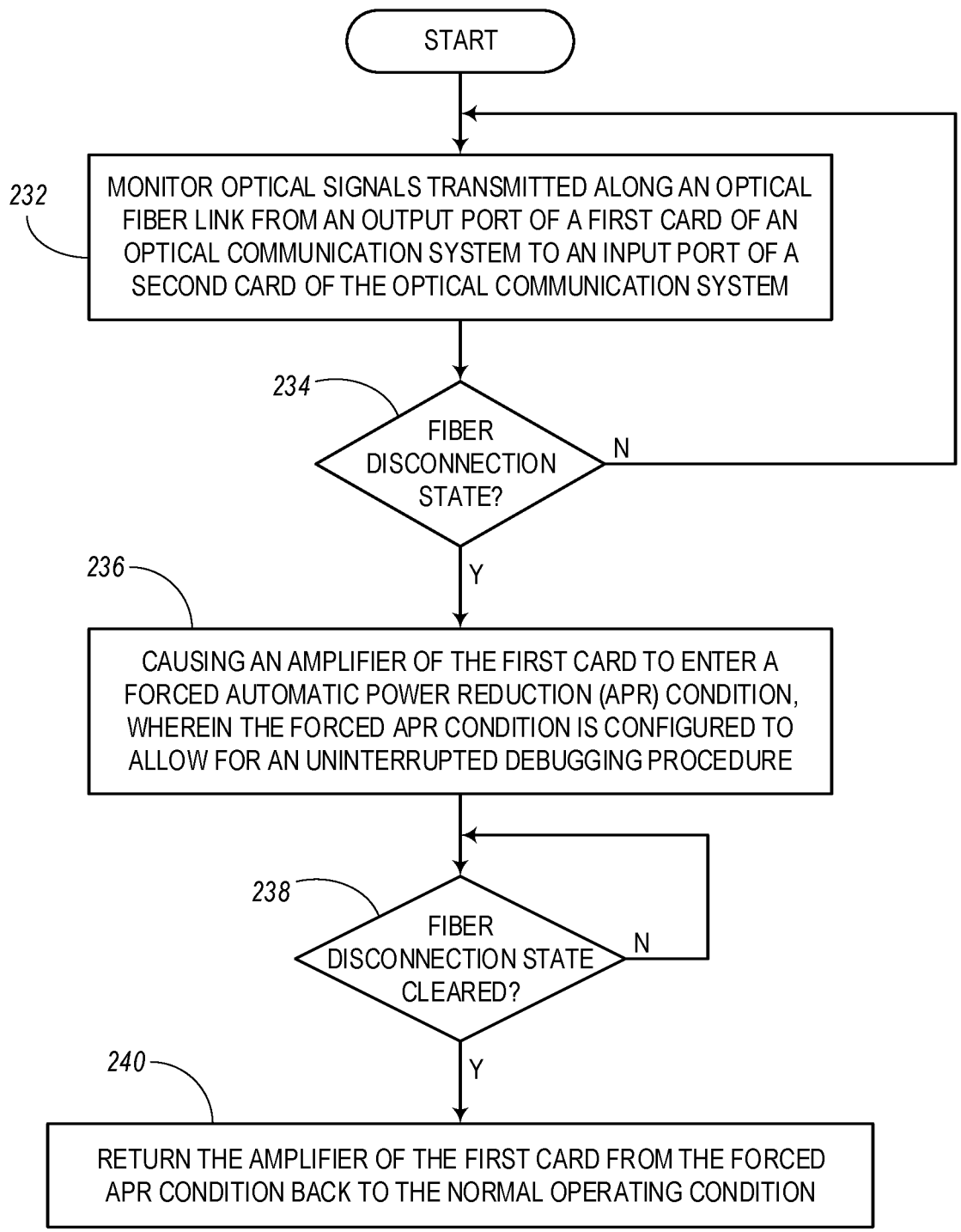
FIG. 11 is a flow diagram illustrating a process for handling fiber disconnect conditions in a node of an optical communication system, according to various embodiments.

FIG. 11 is a flow diagram illustrating an embodiment of a process 230 for handling fiber disconnect conditions in a node of an optical communication system. In this embodiment, the process 230 include the step of monitoring optical signals transmitted along an optical fiber link from an output port of a first card of an optical communication system to an input port of a second card of the optical communication system, as indicated in block 232. In decision block 234, the process 230 includes determining whether or not there is a fiber disconnection state, which may be detected when an amplifier of the first card is in a normal operating condition. When a fiber disconnection state is detected, the process 230 proceeds to block 236, which includes the step of causing the amplifier of the first card to enter a forced Automatic Power Reduction (APR) condition. In addition to potentially reducing the risk of eye damage from laser light emitted from the optical fiber link, the forced APR condition is configured to allow for an uninterrupted debugging procedure. Decision block 238 includes determining whether or not a fiber disconnection state is cleared. If it has not cleared, the process 230 includes continuing to detect until it is cleared. When cleared, the process 230 goes ahead to block 240, which includes the step of returning the amplifier of the first card from the forced APR condition back to the normal operating condition (after receiving an indication that the fiber disconnection state has cleared).

The process 230 may further be defined by other steps, according to some embodiments. For example, the fiber disconnection state may be detected at the start of a cleaning or maintenance procedure. The fiber disconnection state may be detected by determining a high back-reflection at the output port of the first card or a Loss of Signal (LOS) at the input port of the second card. The optical signals may include a substantially full spectrum including Amplified Spontaneous Emission (ASE)-loaded channel holders. The uninterrupted debugging procedure mentioned above may include utilizing a reduced optical power of the amplifier of the first card to debug a lower Optical Return Loss (ORL) or high back-reflection. The first and second cards may be part of a common node, wherein the optical fiber link is an intra-nodal link. Alternatively, the first card may be part of a first node and the second card may be part of a second node, wherein the optical fiber link is an inter-nodal link.

According to some embodiments, the forced APR condition may include operating the amplifier of the first card at a level below a fiber-damage threshold, wherein the fiber-damage threshold, for example, may be about 50 mW. The force APR condition to reduce the risk of eye damage may include operating the amplifier of the first card at level below a 1M safety limit, wherein the 1M safety limit, for example, may be about 21.3 dBm at a wavelength of the optical signals of 1550 nm.

The first card and the second card may be configured to communicate in a non-supervisory system. The indication that the fiber disconnection state has cleared may prevent the returning of the amplifier of the first card from the force APR condition to the normal operating condition based on a back-reflection detection at the output port of the first card due to covering a fiber tip during a fiber cleaning process.

Some of the embodiments described in the present disclosure may utilize a hold-off timer. The system may detect high ORL on a fiber disconnect state (or break) and force APR. The fiber cleaning process or a fiber repair/reconnection process reduces the ORL. Instead of removing the APR, a hold-off timer may be started and allowed to run for a certain amount of time (e.g., 10 to 20 seconds). This may be used in a situation where it is clear that the optical fiber link is disconnected intentionally. If there is a 15 second delay, the time may be kept relatively short to allow traffic to continue again after disruption. If the ORL goes high again, this may indicate a fiber cleaning and the power can be kept low. If the ORL stays low for the time period, then it may be assumed that the optical fiber link has been reconnected and power can be safely increased back to its normal state. If ORL goes high again, the timer may be reset and APR is maintained or forced low again.

Monitoring ORL for a given period of time before clearing the APR condition may be useful in some situations. However, since there may be an uncertainty about the cleaning habits of various users and depending on the period of time, there may be configurable parameters that a user can establish for setting timing cycles as desired based on a customer's preferences. Nevertheless, the embodiments described above may be preferred over the timing countdown implementations. The preferred technique may include an IM-card based approach via a backplane, thereby bypassing controllers in to overcome some cases, such as controller rebooting, etc. The two-end power measurement implementations may use a functioning control plane and communication. ROADM modules in some case may sit in different racks or even different rooms with possibly broken communication links. In this case, the preferred embodiments described above would be beneficial.

The high power on the free end of the optical fiber link can cause the fiber tips to burn or may cause other types of damage to the connector itself. If the fibers or connectors are damaged, they will not be able to operate properly when they are reconnected in the system, especially since they might have very high loss and high reflection. Some of the embodiments describe the methodology when signals are transmitted in one direction. The embodiment of FIG. 8 includes a bi-directional system. Detection can occur on both ports for back-reflection and/or losses.

Cleaning fibers may be necessary if there is initially high reflection already present. Thus, by cleaning the fibers, the reflections, noise, losses, etc. can be reduced. When power is turned up with unclean fibers, the EFDA and/or Raman may detect an already higher reflection. Normally, a technician or other specialist may be needed to visit the site to clean the fibers according to proper practices. However, in the process of cleaning up, it is possible that the fibers can be burned if the power is not reduced according to the embodiments described herein. Normally, a customer is instructed to shut down the amplifiers before disconnecting any fibers for cleaning. However, many customers do not follow these instructions. They may go ahead and disconnect the fiber. Typically, it may not create a problem, because the amps may not be running at a full operational state, but when the system is fully loaded (with ASE channel holders filling empty channel spaces), the increase in power can cause problems. With the more and more ASE-loaded systems being deploying, the embodiments described in the present disclosure provide the benefit of reducing the risk of damage to fibers while also reducing the risk of eye damage and allowing debugging processes to continue.

Another use case for the present disclosure is the protection of optical fiber links when there is a card replacement. The card amplifier, for example, may develop some issues over time and may need to be replaced. Typically, a technician making the card replacement may leave the optical fiber links connected, which may cause problems with the fiber tips. Disconnections can then be done in a safer manner by following the procedures discussed in the present disclosure.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
a processing device; and
a memory device configured to store a computer program having instructions that, when executed, cause the processing device to:
monitor optical signals transmitted along an optical fiber link from an output port of a first card to an input port of a second card, wherein the optical fiber link is an intra-nodal link, wherein the first card and the second card are configured to communicate in a non-supervisory system without supervisory communications to monitor the intra-nodal link;
in response to detecting a fiber disconnection state when an amplifier of the first card is in a normal operating condition, wherein the fiber disconnection state is based on both monitored optical signals at the output port of the first card and the input port of the second card including valid power at the output port of the first card and a Loss of Signal (LOS) at the input port, cause the amplifier of the first card to enter a forced Automatic Power Reduction (APR) condition, wherein the forced APR condition is configured to allow for an uninterrupted debugging procedure;
perform the uninterrupted debugging procedure with reduced optical power to debug an issue of lower Optical Return Loss (ORL) or higher back-reflection; and
return the amplifier of the first card from the forced APR condition back to the normal operating condition after receiving an indication that the fiber disconnection state has cleared where both the output port and the input port have valid power levels.

2. The system of claim 1, wherein the fiber disconnection state is detected at a start of a fiber fault, a fiber cleaning procedure, or a fiber maintenance procedure.

3. The system of claim 1, wherein the fiber disconnection state is detected by determining that a back-reflection at the output port of the first card exceeds a first threshold or an Optical Return Loss (ORL) at the output of the first card drops below a second threshold and that a Loss of Signal (LOS) at the input port of the second card is detected.

4. The system of claim 3, wherein the indication that the fiber disconnection state has cleared is based on determining that the back reflection drops below the first threshold or the ORL exceeds the second threshold and that the LOS is no longer detected.

5. The system of claim 1, wherein the optical signals include a substantially full spectrum including traffic channels and/or Amplified Spontaneous Emission (ASE)-loaded channel holders.

6. The system of claim 1, wherein the forced APR condition includes operating the amplifier of the first card at a level below a fiber-damage threshold and an eye-damage threshold.

7. The system of claim 1, wherein the force APR condition is further configured to reduce a risk of eye damage from laser light emitted from the optical fiber link by operating the amplifier of the first card at a level below a 1M safety limit.

8. The system of claim 1, wherein one of the first and second cards is a Raman card and the other of the first and second cards is an Erbium-Doped Fiber Amplifier (EDFA) card.

9. The system of claim 8, wherein the first card is a Raman card and the second card is an EDFA card, wherein, in response to detecting the fiber disconnection state, the instructions further cause the processing device to shut down Raman pumps of the Raman card to reduce power below a fiber-damage threshold and an eye-damage threshold, and wherein, in response to receiving the indication that the fiber disconnection state has cleared, the instructions further cause the processing device to turn the Raman pumps back to normal operation.

10. The system of claim 1, further comprising a first controller in communication with the first card and a second controller in communication with the second card, wherein the first and second controllers are configured to detect when the fiber disconnection state occurs and when the fiber disconnection state is cleared.

11. A non-transitory computer-readable medium configured to store computer logic having instructions that, when executed, cause one or more processing devices to:
monitor optical signals transmitted along an optical fiber link from an output port of a first card to an input port of a second card, wherein the optical fiber link is an intra-nodal link, wherein the first card and the second card are configured to communicate in a non-supervisory system without supervisory communications to monitor the intra-nodal link;
in response to detecting a fiber disconnection state when an amplifier of the first card is in a normal operating condition, wherein the fiber disconnection state is based on both monitored optical signals at the output port of the first card and the input port of the second card including valid power at the output port of the first card and a Loss of Signal (LOS) at the input port, cause the amplifier of the first card to enter a forced Automatic Power Reduction (APR) condition, wherein the forced APR condition is configured to allow for an uninterrupted debugging procedure;
perform the uninterrupted debugging procedure utilizing a reduced optical power to debug an issue of lower Optical Return Loss (ORL) or higher back-reflection; and
return the amplifier of the first card from the forced APR condition back to the normal operating condition after receiving an indication that the fiber disconnection state has cleared where both the output port and the input port have valid power levels.

12. The non-transitory computer-readable medium of claim 11, wherein the fiber disconnection state is detected at a start of a fiber fault, a fiber cleaning procedure, or a fiber maintenance procedure, and wherein the fiber disconnection state is detected by determining a high back-reflection at the output port of the first card or a Loss of Signal (LOS) at the input port of the second card.

13. The non-transitory computer-readable medium of claim 11, wherein the optical signals include a substantially full spectrum including traffic channels and/or Amplified Spontaneous Emission (ASE)-loaded channel holders.

14. A method comprising the steps of:
monitoring optical signals transmitted along an optical fiber link from an output port of a first card to an input port of a second card, wherein the optical fiber link is an intra-nodal link, wherein the first card and the second card are configured to communicate in a non-supervisory system without supervisory communications to monitor the intra-nodal link;
in response to detecting a fiber disconnection state when an amplifier of the first card is in a normal operating condition, wherein the fiber disconnection state is based on both monitored optical signals at the output port of the first card and the input port of the second card including valid power at the output port of the first card and a Loss of Signal (LOS) at the input port, causing the amplifier of the first card to enter a forced Automatic Power Reduction (APR) condition, wherein the forced APR condition is configured to allow for an uninterrupted debugging procedure;
performing the uninterrupted debugging procedure utilizing a reduced optical power to debug an issue of lower Optical Return Loss (ORL) or higher back-reflection; and
returning the amplifier of the first card from the forced APR condition back to the normal operating condition after receiving an indication that the fiber disconnection state has cleared where both the output port and the input port have valid power levels.

15. The method of claim 14, wherein the forced APR condition includes operating the amplifier of the first card at a level below a fiber-damage threshold, wherein the fiber-damage threshold is about 50 mW, wherein the forced APR condition is further configured to reduce a risk of eye damage from laser light emitted from the optical fiber link by operating the amplifier of the first card at a level below a 1M safety limit, and wherein the 1M safety limit is about 21.3 dBm at a wavelength of the optical signals of 1550 nm.

* * * * *